(12) United States Patent
Li

(10) Patent No.: US 7,948,366 B2
(45) Date of Patent: May 24, 2011

(54) CAR SPEED ALARM SYSTEM

(76) Inventor: Shih-Hsiung Li, Taipei (TW)

( * ) Notice: Subject to any disclaimer, the term of this patent is extended or adjusted under 35 U.S.C. 154(b) by 594 days.

(21) Appl. No.: 12/038,269

(22) Filed: Feb. 27, 2008

(65) Prior Publication Data
US 2008/0218327 A1 Sep. 11, 2008

(30) Foreign Application Priority Data
Mar. 7, 2007 (TW) .............................. 96107898 A

(51) Int. Cl.
*B60Q 1/50* (2006.01)
(52) U.S. Cl. ........ 340/467; 340/435; 340/436; 340/441; 340/463; 340/479; 180/167; 180/169; 180/178; 180/271; 701/1; 701/34; 701/36
(58) Field of Classification Search .................. 340/467, 340/435, 436, 438, 439, 441, 463, 479, 575, 340/576, 902–905, 932; 180/167–171, 271; 701/1, 34–36, 60, 70; 280/734–735
See application file for complete search history.

(56) References Cited

U.S. PATENT DOCUMENTS

| | | | | | |
|---|---|---|---|---|---|
| 4,614,932 | A | * | 9/1986 | Matsumoto et al. | 340/463 |
| 5,835,008 | A | * | 11/1998 | Colemere, Jr. | 340/439 |
| 6,121,896 | A | * | 9/2000 | Rahman | 340/902 |
| 6,225,918 | B1 | * | 5/2001 | Kam | 340/903 |
| 6,351,211 | B1 | * | 2/2002 | Bussard | 340/468 |
| 6,831,572 | B2 | * | 12/2004 | Strumolo et al. | 340/903 |

* cited by examiner

*Primary Examiner* — George A Bugg
*Assistant Examiner* — Sisay Yacob
(74) *Attorney, Agent, or Firm* — Apex Juris, pllc; Tracy M Heims

(57) ABSTRACT

A car speed alarm system is installed in a vehicle and has a modulation module and a demodulation module. The modulation module sends a car speed signal to cars behind when the car is decelerating. The cars behind use their demodulation module to read the transmitted car speed signal and notify their drivers, so that the drivers know how and when to reduce their speeds.

6 Claims, 4 Drawing Sheets

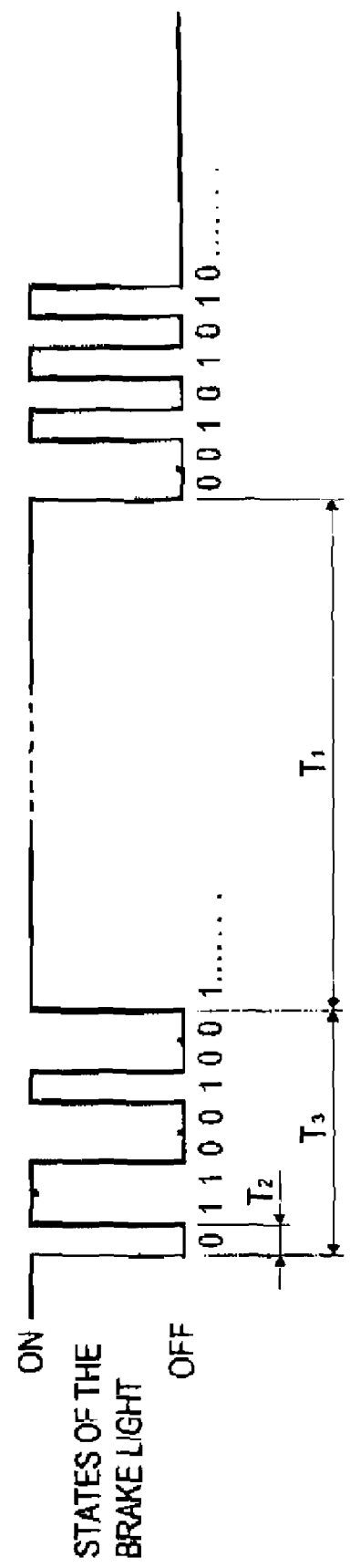

CAR SPEED ALARM SYSTEM

BACKGROUND OF THE INVENTION

1. Field of the Invention

The invention relates to an alarm system and, in particular, to a car speed alarm system.

2. Description of Related Art

Due to the popularity of cars, there are more people driving their own cars. A direct consequence is that there are more car accidents. Among all accidents, collisions from behind are the most common type.

One primary cause of collisions from behind is either the distance between cars is too short or the car speed is too fast. If a car in the front suddenly decelerates, the driver of the car directly behind often does not have sufficient time to react, resulting in collisions. To reduce the above-mentioned car accident rate, people often put a set of distance check signs at appropriate places (e.g., "0 m," "50 m," "100 m," and "200 m" signs at 0 m, 50 m, 100 m, and 200 m). Alternatively, several car distance alarm lines are drawn at equal intervals on each lane. These methods help drivers keep appropriate distances from the cars in front of them. This can prevent some of the collisions from behind. However, the car distance check sips or car distance alarm lines are installed or drawn at fixed or specific places. Car drivers cannot check the distances at any time.

To notify the driver of the car behind, each car is provided with several brake lights. When a driver steps on the brake, the brake lights are turned on so that drivers of the cars behind can slow down their speeds appropriately. However, the existing brake lights have only ON and OFF states, without providing any additional information. For example, the brake lights cannot provide the car speed information to the drivers behind. Thus, even if the drivers of the cars behind know that the car in the front is decelerating, the collision may still happen because he does not know about how large the deceleration is.

SUMMARY OF THE INVENTION

To solve the problem that existing brake lights do not provide car speed information to the cars behind and may result in collisions, the objective of the invention provides a car speed alarm system installed in the vehicle. The car speed alarm system has a modulation module and a demodulation module.

The modulation module outputs the car speed to the cars behind, and comprises a brake sensor to detect brake actions;

a speed sensor to detect the car speed;

a microprocessor having input terminals being connected with the brake sensor and the speed sensor, wherein the microprocessor is triggered by the brake sensor and reads the car speed during the brake, and the car speed is converted into a binary signal for output; and a brake light connected with the output terminals of the microprocessor and generating a binary light signal with varying brightness according to the binary signal.

The demodulation module analyzes the binary light signal sent from the modulation module, and comprises a sensing unit receiving the binary light signal from the brake light of the car in the front and the environmental background light signal;

a processing unit connected with the output terminal of the sensing unit to receive the output signal from the sensing unit and determining the brightness variation of the brake light of the car in the front; and an outputting unit connected with the output terminal of the processing unit to receive and output the output signal of the processing unit.

The car in the front can transmit via the modulation module car speed information to the demodulation module of the car behind. The driver of the car behind thus knows the car speed of the car in the front as it decelerates. The driver of the car behind can appropriately adjust his car speed and distance, thereby avoiding collision from behind.

BRIEF DESCRIPTION OF THE DRAWINGS

FIG. 4 is a schematic view of the binary signal used in the invention.

DETAILED DESCRIPTION OF THE PREFERRED EMBODIMENT

Figure 1:
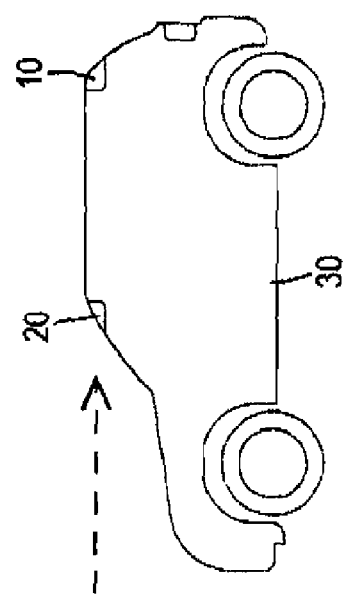
FIG. 1 is an operational view of a car speed alarm system in accordance with the present invention.
Figure 1:
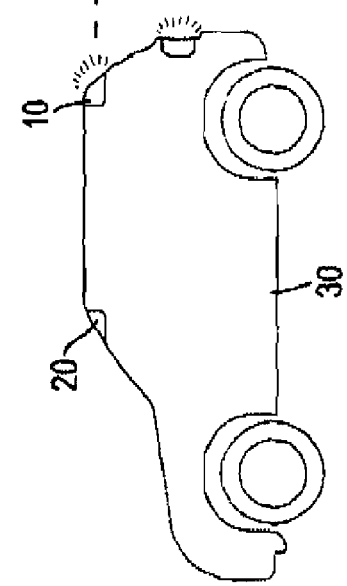

With reference to FIG. 1, a car speed alarm system in accordance with the present invention is installed in a car 30. The car speed alarm system includes a modulation module 10 and a demodulation module 20.

Figure 2:
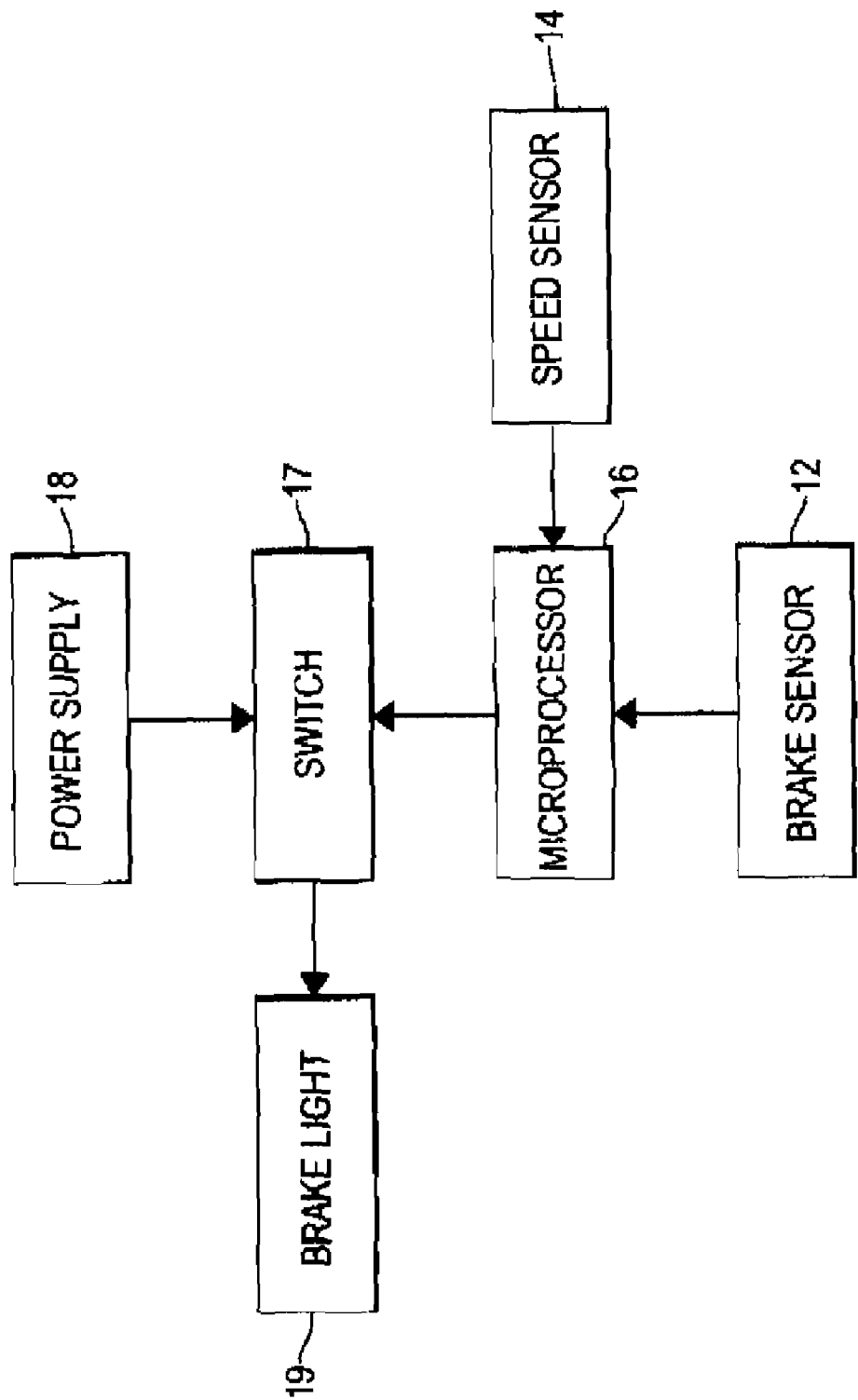
FIG. 2 is a system block diagram of a modulation module of the car speed alarm system in accordance with the present invention.

With further reference to FIG. 2, the modulation module 10 includes a brake sensor 12, a speed sensor 14, a microprocessor 16, a switch 17, a power supply 18 and a brake light 19. The output terminals of the brake sensor 12 and the speed sensor 14 are connected to the microprocessor 16. The output terminal of the microprocessor 16 is connected to the control terminal of the switch 17. The input terminal of the switch 17 is connected to the power supply 18. The output terminal of the switch 17 is connected to the brake light 19. The brake light 19 is disposed at the rear part of the car 30 in order to send signals to the cars behind.

Figure 3:
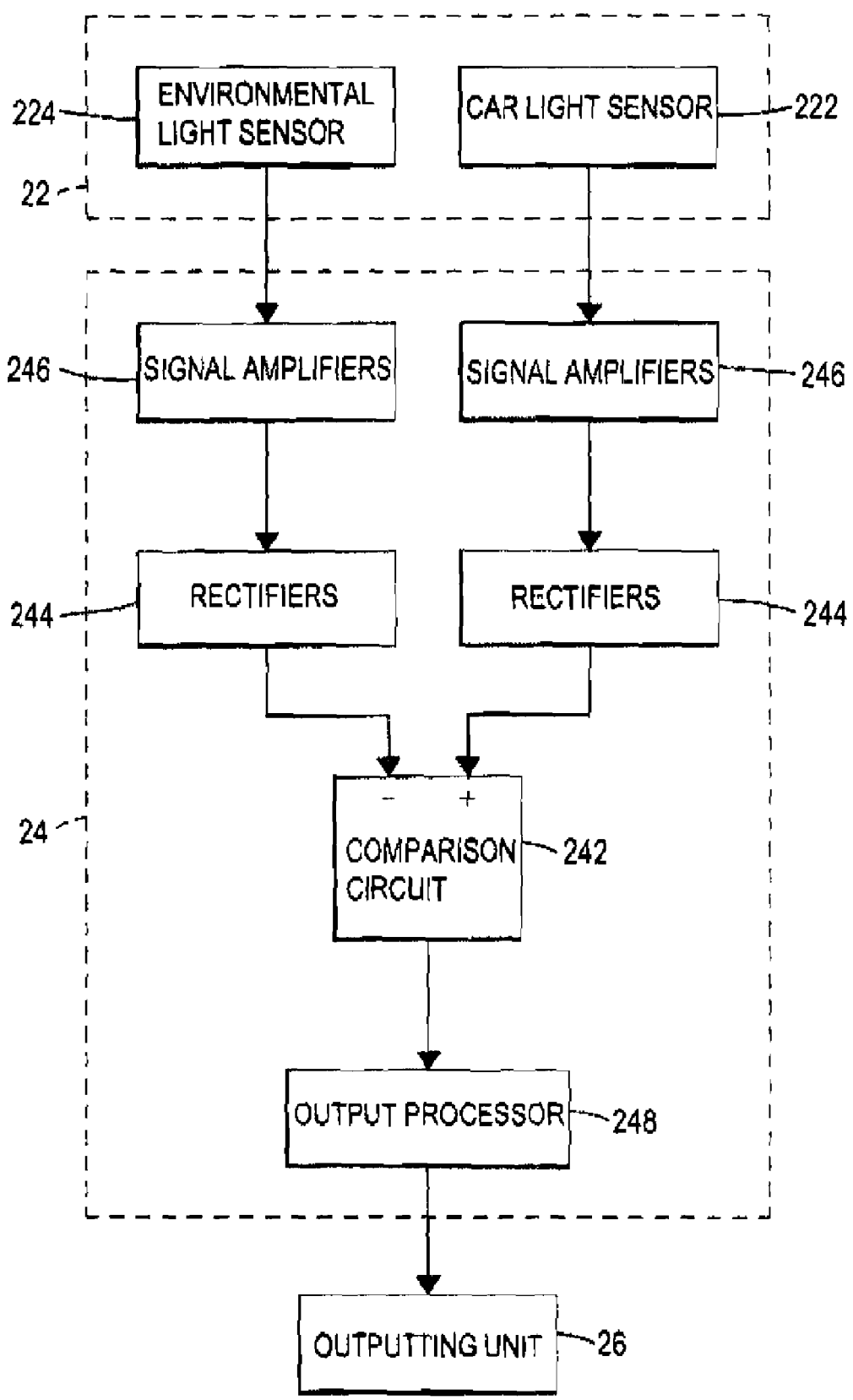
FIG. 3 is a system block diagram of a demodulation module of the car speed alarm system in accordance with the present invention.

With further reference to FIG. 3, the demodulation module 20 includes a sensing unit 22, a processing unit 24 and an outputting unit 26. The output terminal of the sensing unit 22 is connected to the processing unit 24. The output terminal of the processing unit 24 is connected to the outputting unit 26. Besides, the sensing unit 22 has to be disposed in the front part of the car 30 for receiving signals from the cars ahead of it.

The processing unit 24 further includes one comparison circuit 242, two rectifiers 244, two signal amplifiers 246, and one output processor 248. The two input terminals of the comparison circuit 242 are first connected in series with one of the rectifiers 244, respectively, then connected to one of the signal amplifiers 246. The output terminal of the comparison circuit 242 is connected to the output processor 248.

Moreover, the sensing unit 22 also includes a car light sensor 222 and an environmental light sensor 224. The output terminal of the car light sensor 222 is connected with the signal amplifier 246 that is connected to the positive input terminal of the comparison circuit 242. The output terminal of the environmental light sensor 224 is connected with the signal amplifier 246 that is connected to the negative input terminal of the comparison circuit 242.

Suppose two cars are provided with the car speed alarm systems, or the car in the front is installed with the disclosed modulation module 10 and the car behind is installed with the disclosed demodulation module 20. When the front car is braking, the brake sensor 12 outputs a triggering signal to the microprocessor 16. The microprocessor 16 uses the speed sensor 14 to read the current car speed of the front car. Afterwards, the microprocessor 16 converts the car speed into a binary signal with multiple bits. The binary signal is used to control the switch 17, so that the switch 17 is ON or OFF accordingly. When the bit of the binary signal is "1," the switch 17 is turned on. When the bit is "0," the switch 17 is turned off. In the case when the switch 17 is turned on, the brake light 19 and the power supply 18 are disconnected. Therefore, the brake light 19 is off. When the switch 17 is turned off, the brake light 19 and the power supply 18 are electrically connected so that the brake light 19 is turned on.

The car light sensor 222 and the environmental light sensor 224 of the rear car keep receiving brightness change of the surrounding light. The signals received by the car light sensor 222 and the environmental light sensor 224 go through the signal amplifier 246 and the rectifier 244. The results are fed into the comparison circuit 242 for a comparison. When the brake light 19 of the front car is on, the light signal strength received by the car light sensor 222 of the rear car is larger than the environmental background light strength received by the environmental light sensor 224. The comparison circuit 242 of the rear car outputs a high-voltage signal. On the other hand, if the brake light 19 of the front car is off, the light signal strength received by the car light sensor 222 of the rear car is smaller than the environmental background light strength received by the environmental light sensor 224. The comparison circuit 242 outputs a low-voltage signal. The comparison circuit 242 of the rear car outputs the result to the output processor 248. The output processor 248 converts and outputs the output data of the comparison circuit 242 to the outputting unit 26 for notifying the driver thereof.

For example, suppose the front car is braking while running at a speed of 100 km/hr. The binary signal output from the microprocessor 16 to the switch 17 is "01100100." Therefore, the switch 17 of the front car turns on and off according to the binary signal, with "0" representing OFF and "1" representing ON of the switch 17. The brake light 19 of the front car is thus on and off, as shown in FIG. 4. The sensing unit 22 of the rear car receives the light signal "01100100" sent from the brake light 19 of the front car. The processing unit 24 converts the light signal into a signal acceptable by the outputting unit 26. The converted signal is then output to notify the driver of the rear car. Moreover, the switch 17 can be transistor, such as a metal oxide semiconductor field effective transistor (MOSFET). In this case, the gate of the MOSFET is connected to the output terminal of the microprocessor 16. Its source is connected to the power supply 18. Its drain is connected to the brake light 19. Thus, when the microprocessor 16 outputs a high-voltage signal, the transistor is conductive so that the electrical power of the power supply 18 is output to the brake light 19.

The outputting unit 26 is a display or voice player for outputting the output signal of the processing unit 24 and alerting the driver of the rear car. In the previous example, the outputting unit 26 notifies the driver of the rear car about the information of 100 km/hr by LED display or playing voices.

To avoid misjudgment due to the interference of other environmental light noises also with varying brightness and to prevent the driver of the rear car from being disturbed by the flashing brake light 19 of the front car, the transmission rate of the output terminal of the microprocessor 16 can be tuned so that the brake light 19 transmits information at a fixed flashing rate, such as 9600 bit/sec. In that case, each bit is transmitted within about 1 ms (T2 in FIG. 4). Because of visual persistence of human eyes, the driver of the rear is not disturbed by the brake light 29 of the front car flashing at such a high rate. Moreover, the stable transmission rate also enables the demodulation module 20 to distinguish the signal from the brake light 19 from the variation in the environmental light. Consequently, the output processor 248 of the rear car is free from misjudgment.

Besides, the delay time for a normal car driver to execute braking is usually greater than 1 second (T1+T3). When the car driver starts to step on the brake, a braking signal is transmitted at the above-mentioned rate to the rear car. The time (T3) required for the signal transmission is about several milliseconds. The output of the comparison circuit 242 of the rear car is a series of high-voltage levels (e.g., signal with the T1 interval). To prevent the output processor 248 from misjudging on the signal with the T1 interval, the front car can use a fixed and fast transmission rate (shortening T2). This can effectively distinguish the car speed signal from the quick brake light flashing due to the intermittent braking by the driver of the front car. As shown in FIG. 4, the interval of the intermittent braking by the driver of the front car is T1. T1 is general is much larger than T2. Therefore, the car light sensor 222 of the rear car can easily tell them apart.

In summary, the invention enables the brake light 19 of a car to transmit its speed to the cars behind. The driver of the car behind is not only notified about the deceleration of the car in the front but also knows about its current speed. The driver of the rear car can thus appropriately adjust his own speed in order to keep a safe distance from the front car, thereby preventing a possible collision.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A car speed alarm system installed on a car, the car speed alarm system comprising:
   a modulation module having
      a brake sensor detecting a brake action of the car;
      a speed sensor detecting a car speed;
      a microprocessor having input terminals connected with the brake sensor and the speed sensor respectively, being triggered by the brake sensor to read the car speed during the brake action, and converting the car speed into a binary signal for output; and
      a brake light being connected with the microprocessor to receive the binary signal and to vary in its brightness corresponding to the binary signal, and to output a binary light signal;
      a switch having
         a control terminal connected with an output terminal of the microprocessor;
         an input terminal connected with a power supply; and
         an output terminal connected with the brake light, so that the microprocessor controls the ON and OFF of the switch according to the binary signal, generating variation in the brightness of the brake light; and a demodulation module having
  a sensing unit comprising:
    a car light sensor for detecting the brake light signal from the car in the front; and
    an environmental light sensor for detecting an environmental background light signal;
  a processing unit being connected with the sensing unit to receive the input signal and determining the variation in the brightness of the brake light of the front car, the processing unit comprising
    two signal amplifiers respectively connected to the car light sensor and the environmental light sensor to amplify brake light signal and the environmental background light signal;
    two rectifiers respectively connected to the two signal amplifiers;
    one comparison circuit having a positive input and a negative input both being respectively connected to the two rectifiers, and comparing brake light signal with the environmental background light signal;
    an output processor connected to an output terminal of the comparison circuit to receive a comparison result, and having an output terminal connected with the outputting unit; and
  an outputting unit being connected with the processing unit to receive and output an output signal.

2. The car speed alarm system as claimed in claim 1, wherein the switch is a transistor.

3. The car speed alarm system as claimed in claim 2, wherein the outputting unit is a display device.

4. The car speed alarm system as claimed in claim 2, wherein the outputting unit is a voice player.

5. The car speed alarm system as claimed in claim 2, wherein the rectifiers are half-wave rectifiers.

6. The car speed alarm system of claim 1, wherein the data transmission rate of the brightness variation of the brake light is 9600 bit/sec.

* * * * *